(12) United States Patent
Polk et al.

(10) Patent No.: US 8,031,603 B1
(45) Date of Patent: Oct. 4, 2011

(54) TECHNIQUE FOR REDUCING RESOURCES ALLOCATED TO AN EXISTING RESERVATION IN A DATA NETWORK

(75) Inventors: James M. Polk, Colleyville, TX (US); Subhasri Dhesikan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 984 days.

(21) Appl. No.: 11/173,909

(22) Filed: Jun. 30, 2005

(51) Int. Cl.
    *H04L 1/00* (2006.01)
(52) U.S. Cl. ......... 370/235; 370/468; 709/229; 709/240
(58) Field of Classification Search .......... 370/229–235, 370/468; 709/227–229
    See application file for complete search history.

(56) References Cited

U.S. PATENT DOCUMENTS

| | | | |
|---|---|---|---|
| 6,493,317 B1 | 12/2002 | Ma | |
| 6,665,273 B1 | 12/2003 | Goguen et al. | |
| 6,771,661 B1 | 8/2004 | Chawla et al. | |
| 6,876,668 B1 | 4/2005 | Chawla et al. | |
| 2002/0036982 A1* | 3/2002 | Chen | 370/230 |
| 2002/0062376 A1* | 5/2002 | Isoyama | 709/229 |
| 2002/0091810 A1* | 7/2002 | Hundscheidt et al. | 709/231 |
| 2007/0005772 A1* | 1/2007 | Mudigonda et al. | 709/226 |
| 2008/0192632 A1* | 8/2008 | Bader | 370/230.1 |

OTHER PUBLICATIONS

Polk, J., et al., "RSVP Extension for Bandwidth Reduction of an Aggregate", draft-polk-rsvp-aggregate-reduction-00.txt, Internet Engineering Task Force (IETF), pp. 1-15, Jul. 12, 2004.
Polk, J., et al., "A Resource Reservation Extension for the Reduction of Bandwidth of a Reservation Flow", draft-ietf-tsvwg-rsvp-bw-reduction-00.txt, IETF, pp. 1-19, Feb. 10, 2005.
Braden, R., Ed., et al., "Resource ReSerVation Protocol (RSVP)", Request for Comments (RFC)2205, IETF, pp: 1-112, Sep. 1997.
Wrocklawski, J., "The Use of RSVP with IETF Integrated Services", RFC2210, IETF, pp. 1-33, Sep. 1997.
Herzog, S., "RSVP Extensions for Policy Control", RFC2750, IETF, pp. 1-13, Jan. 2000.
Herzog, S., "Signaled Preemption Priority Policy Element" RFC2751, IETF, pp. 1-12, Jan. 2000.
Baker, F., et al., "Aggregation of RSVP for IPv4 and IPv6 Reservations", RFC3175, IETF, pp. 1-36, Sep. 2001.
Herzog, S., "Signaled Preemption Priority Policy Element", RFC3181, IETF, pp. 1-12, Oct. 2001.
Schulzrinne, H., et al., "RTP: A Transport Protocol for Real-Time Applications", RFC3550, IETF, pp. 1-104, Jul. 2003.
Zhang, L., et al., "RSVP: A New Resource ReSerVation Protocol", *Institute of Electrical and Electronic Engineers (IEEE) Network*, pp. 1-22 (1993).
"Resource Reservation Protocol", Internetworking Technologies Handbook Cisco Systems, Inc., © 1992-2005, pp. 48-1 to 48-12.

* cited by examiner

*Primary Examiner* — Pao Sinkantarakorn

(57) ABSTRACT

A technique that allows existing reservations to be partially preempted by higher-priority reservations. An intermediate node receives a request to reserve resources for the higher-priority reservation. The higher priority entitles the reservation to acquire resources allocated to existing lower priority reservations, if necessary. If sufficient unallocated resources are not available on the preempting system to accommodate the higher-priority reservation, an error message is generated and forwarded by the intermediate node towards a receiver associated with the reservation that is to be partially preempted. The error message contains an error code and an amount of resources available on the intermediate node. The receiver processes the error message including selecting a reservation to be torn down, tearing down the selected reservation and re-reserving resources for remaining reservations, as necessary.

9 Claims, 10 Drawing Sheets

TECHNIQUE FOR REDUCING RESOURCES ALLOCATED TO AN EXISTING RESERVATION IN A DATA NETWORK

FIELD OF INVENTION

This invention relates to data networks and, more specifically, to reducing resources allocated to an existing reservation in a data network.

BACKGROUND OF THE INVENTION

A data network is a geographically distributed collection of nodes interconnected by communication links and segments for transporting data between end nodes, such as personal computers and workstations. Many types of data networks are available, with the types ranging from local area networks (LANs) to wide area networks (WANs). LANs typically connect nodes over dedicated private communication links located in the same general physical location, such as a building or campus. WANs, on the other hand, typically connect large numbers of geographically dispersed nodes over long-distance communication links, such as common carrier telephone lines. The Internet is an example of a WAN that connects networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

In a typical arrangement, end nodes in a data network are coupled via one or more intermediate nodes, such as routers. Routers are often configured to "route" data, such as packets, between various nodes in the network. Routing is typically performed at layer-3 (L3), which is the network layer of the Open Systems Interconnection Reference Model (OSI-RM). Routers often maintain forwarding databases (FDBs), which are typically configured to hold routing information including L3 addresses and interface information that the router uses to determine where data (e.g., data packets) are to be forwarded in order to reach their destination. For example, a router may have a routing database containing one or more entries wherein each entry contains a L3 destination address of a destination node and interface information about an interface on the router through which the destination node may be reached. A data packet containing a destination address that matches a destination address of an entry in the routing table is forwarded by the router to the interface specified by the matching entry for transfer to the destination node.

A router may execute one or more routing protocols that enable the router to route packets and exchange routing information with other routers in the network. The routers often use this information to configure (e.g., compute) their FDBs. The routing protocols may include distance-vector protocols, such as the Routing Information Protocol (RIP), or link-state protocols, such as the Intermediate-System-to-Intermediate-System (IS-IS) protocol and the Open Shortest Path First (OSPF) protocol. Routing information is typically exchanged between the routers in the form of advertisement messages. For example, nodes executing the IS-IS protocol exchange routing information using an advertisement message called a Link State Packet (LSP). Likewise, nodes executing the OSPF protocol exchange routing information using an advertisement message called a Link State Advertisement (LSA). An intermediate node that acquires an advertisement message may use information contained therein to update its FDB.

Data networks are increasingly being used to transport many forms of information including voice and video information. Voice information may be carried by various technologies including e.g., Voice over IP (VoIP). VoIP refers to a group of technologies that may be used to transmit voice information over data networks from a source (calling party) to a destination (called party). Such networks may include a plurality of voice agents that convert voice information from its traditional telephony form to a form that is suitable for packet transmission. In other words, the voice agent encodes, compresses and encapsulates the voice information into a plurality of data packets. Examples of voice agents include IP telephones, VoIP gateways, certain private branch exchanges (PBXs), personal computers (PCs) running communication applications, network devices providing voice gateway services and so on. A calling party uses a voice agent to initiate a VoIP call. Once the voice information has been converted into packet format, it is carried by the computer network to a second voice agent configured to serve the called party. The called party's agent processes (e.g., unencapsulates, decompresses and decodes) the data packets to produce the original voice information. This information may then be presented to the called party, accordingly.

Similarly, video information may be carried by various technologies that include video conferencing. Here, video information may be processed much like voice information is processed in VoIP systems, that is, the video information may be e.g., encoded and compressed, and encapsulated into data packets by a video agent at a calling party. The packets are then transferred via a data network using a protocol, such as e.g., the Real-Time Transport Protocol (RTP), to a video agent at the called party. The called party's agent processes (e.g., unencapsulates, decompresses and decodes) the data packets to produce the original video information which may be presented to the called party, accordingly.

Unlike static data files or records, voice and video information tends to be highly sensitive to delayed and lost packets as well as jitter. Delays in receiving packets or the loss of packets may seriously degrade the quality of the information as experienced at the called party's agent. Excessive jitter my trigger retransmission mechanisms which may further degrade the quality of information experienced at the called party's agent. Accordingly, packets carrying this information must ideally be delivered to the called party with a high probability of success and, in a timely and consistent manner.

Data networks typically incorporate various services and resources to obviate the effects of delayed and lost packets and jitter, and to ensure successful, timely and consistent delivery of data packets. In particular, an intermediate node (e.g., a router) in the data network may provide specific resources and/or services that are configured to affect the rate at which traffic moves through the node in an effort to avoid traffic congestion in the network that may lead to lost or delayed traffic, and jitter. These resources and/or services may include priority queues, filter settings, traffic shapers, queue selection strategies, congestion control algorithms and the like. Depending on the selection or allocation of such resources and services within the network, different types of traffic may be forwarded at different rates and at different priorities in the network in an effort to avoid congestion and ensure timely and consistent delivery of the traffic.

Some applications may incorporate unidirectional data flows configured to transfer time-sensitive traffic from a source (sender) in a data network to a destination (receiver) in the network in accordance with a certain "quality of service" (QoS) associated with each data flow. Here, network resources may be reserved for a unidirectional flow to ensure that the QoS associated with the data flow is maintained. The Resource Reservation Protocol (RSVP) is a network-control protocol that enables applications to reserve resources for data flows in order to obtain a certain degree of QoS for the data flows. RSVP works in conjunction with routing protocols to reserve resources for data flows in a data network in order to establish a level of QoS required by the data flows. RSVP is defined in R. Braden, et al., "Resource ReSerVation Protocol (RSVP)," Request For Comments (RFC) 2205.

Pursuant to RSVP, a data flow is a sequence of messages that have the same source address and same destination address (unicast or multicast). Data flows are unidirectional in that data travels on a data flow from a sender to a receiver. A session is a collection of one or more data flows that have the same unicast or multicast destination address. Sessions typically utilize port and protocol numbers much like data flows. Sessions differ from data flows in that a session may have multiple senders, whereas a data flow only originates from a single sender.

In a protocol, such as RSVP, signaling messages are used to reserve resources for data flows. RSVP defines two fundamental types of signaling messages, a RSVP path (Path) message and a RSVP reservation request (Resv) message. Path messages are typically sent by senders to identify them and indicate the resources (e.g., bandwidth) needed to receive their programming or content. These messages proceed hop-by-hop on a path through the data network to one or more receivers. The Path messages make intermediate nodes on the path aware of the possibility that a reservation of resources may be required. If a receiver is interested in the programming or content offered by a particular sender, it responds with a RSVP Resv message to reserve resources for a data flow between the sender and receiver. The Resv message specifies resources needed to accommodate the data flow. The Resv message travels hop-by-hop on the same path taken by the Path message but in the reverse direction back to the sender. At each hop, the corresponding intermediate node establishes a reservation for the receiver by setting aside (reserving) resources specified in the Resv message for the data flow. These resources are immediately made available to the data flow. If resources are not available, the reservation may be refused explicitly so that the receiver knows it cannot depend on the corresponding resources being devoted to its traffic. By using RSVP, packets carrying, e.g., time-sensitive information can be accorded the resources and services they need to ensure timely and consistent delivery.

The RSVP protocol supports individual reservations and aggregate reservations. An individual reservation relates to a single reservation associated with a single data flow between a sender and a receiver. An aggregate reservation relates to a reservation that is an aggregate of a plurality of reservations who all share an "aggregate region." An aggregation region refers to a region in a data network where some number of data flows flow through the same set of intermediate nodes. In other words, the data flows travel through the same intermediate nodes in the data network in the aggregation region. Like individual reservations, aggregate reservations have a sender ("aggregator") and a receiver ("deaggregator") associated with the aggregate reservation. Flows associated with reservations belonging to an aggregate reservation are aggregated (bundled) at the aggregate reservation's "aggregator" and "deaggregated" (unbundled) at the aggregate reservation's "deaggregator."

Reservation protocols, such as RSVP, often support the prioritization and preemption of reservations. Prioritization generally relates to a preference (priority) given to a reservation with respect to allocating resources to the reservation over other reservations. Preemption generally relates to pre-empting an existing lower priority reservation in order to reallocate its resources to a newer higher-priority reservation. Typically, the preempted reservation is preempted by: (1) tearing down (removing) the entire reservation by sending an error message to the reservation's receiver and (2) reallocating its resources as necessary to the newer reservation. Any remaining resources from the preempted reservation that were not allocated to the newer reservation are made available for future reservations.

One problem with the preempting technique described above is that it is inefficient from a resource allocation standpoint. For example, assume an existing reservation is an aggregate reservation containing hundreds of individual reservations wherein each individual reservation is for a data flow that carries a telephone call. Further, assume a newer higher-priority individual reservation for a data flow that carries a single telephone call is being processed and that the higher-priority reservation only needs a small amount of resources allocated to the existing reservations associated with the aggregate reservation. According to existing techniques, the entire aggregate reservation must be preempted (e.g., torn down) in order to accommodate the newer reservation. This may mean inconveniencing all of the existing telephone calls associated with the existing individual reservations in order to accommodate a single higher-priority call even though the higher-priority call may be accommodated by only inconveniencing a single existing telephone call. Typically, the calls would not be dropped outright; however, the calls would lose their guaranteed resources thus potentially degrading their quality.

Another problem with the above-described preemption technique is that it may be difficult for the preempted reservation to reestablish itself after it has been preempted. For example, existing reservation protocols do not provide an indication as to how much resources are available to the preempted reservation. Thus, the preempted reservation must guess as to how much resources are available in order to reestablish the reservation. If the guess is incorrect, the attempt will fail. Furthermore, an intervening reservation may further reduce the amount of available resources, further complicating efforts to reestablish the preempted reservation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

It should be noted that, illustrated embodiments of the present invention, described herein, are described as using the Resource Reservation Protocol (RSVP) to reserve resources of a data network. RSVP is described in R. Braden, et al., "Resource ReSerVation Protocol (RSVP)," Request For Comments (RFC) 2205, September 1997, available from the Internet Engineering Task Force (IETF) and which is hereby incorporated by reference as though fully set forth herein. It should be noted that other protocols that reserve resources of a data network may take advantage of the present invention.

The present invention overcomes shortcomings associated with the prior art by incorporating a technique that enables existing aggregate reservations to be partially preempted by new higher-priority reservations. According to an aspect of the inventive technique, an intermediate node (preempting system) receives a request to reserve resources for a new reservation that is associated with a priority that is higher than existing reservations. The higher priority entitles the new reservation to acquire resources in the intermediate node that have been allocated to existing reservations (i.e., preempt) if necessary to accommodate the new reservation. If sufficient unallocated resources are not available on the preempting system to accommodate the new reservation, the preempting system (1) selects an aggregate reservation to be partially preempted, (2) generates an error message containing an error code and an amount of resources available on the preempting system for the preempted reservation and (3) forwards the error message towards a deaggregator associated with the selected reservation.

In response to receiving the error message, the deaggregator (1) identifies one or more reservations associated with the selected aggregate reservation that are to be preempted, and (2) for each identified reservation, (a) generates a reservation error message, (b) forwards the generated error message downstream of the identified reservation, (c) generates a reservation teardown message for the identified reservation and (d) forwards the teardown message upstream of the identified reservation. After the selected aggregate reservation has been partially preempted, the receiver generates a new request to reserve resources for the remaining reservations associated with the selected aggregate reservation.

The present invention is an improvement over the prior art because it enables an aggregate reservation to be partially preempted rather than being wholly preempted. Advantageously, by allowing an aggregate reservation to be partially preempted, the present invention lessens the impact of preempting existing reservations to accommodate higher-priority reservations.

Figure 1:
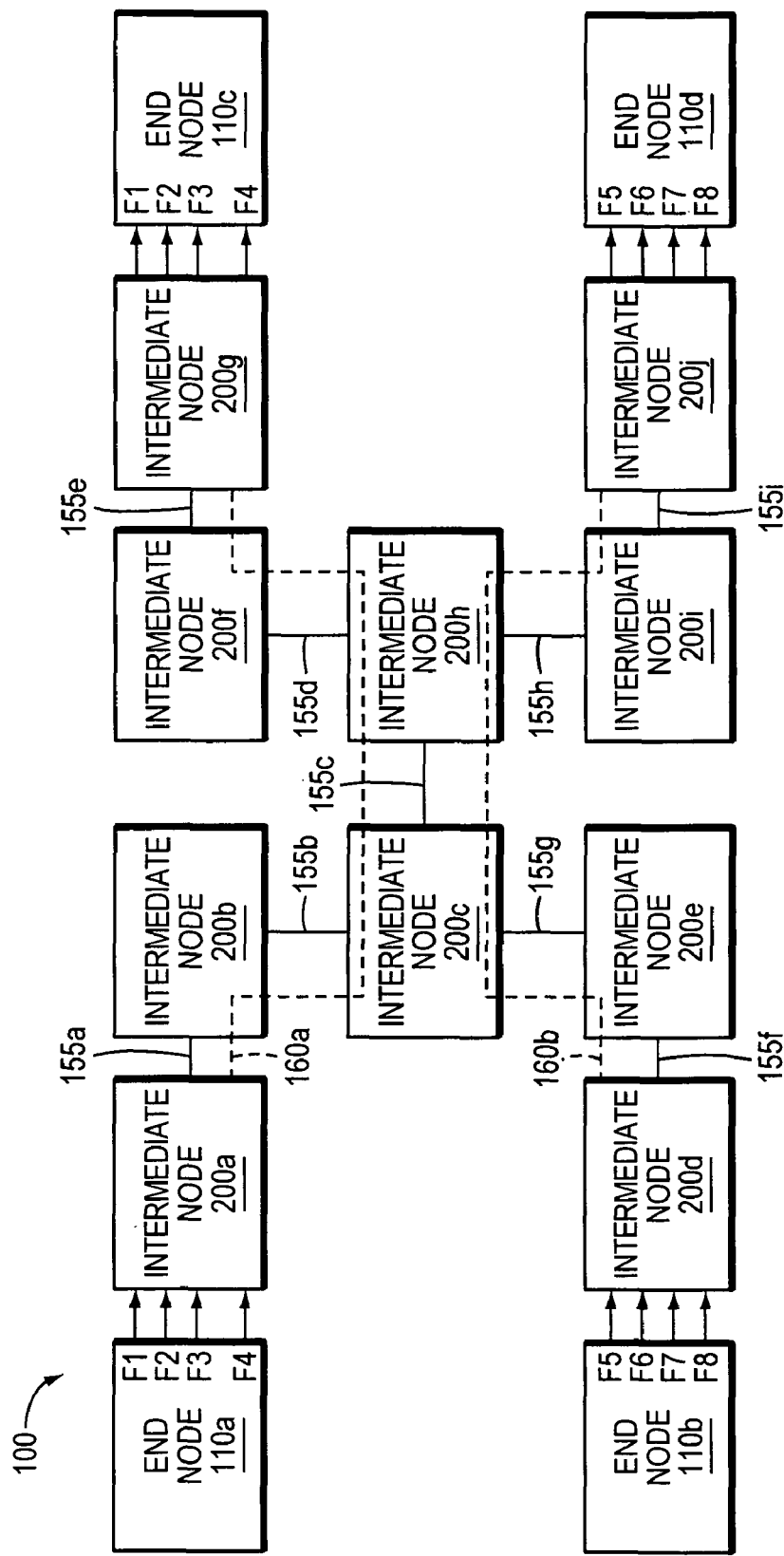
FIG. 1 is a high-level block diagram of an exemplary data network that may implement the present invention.

FIG. 1 is a high-level block diagram of an exemplary data network that may implement the present invention. Data network 100 comprises a collection of communication links 155 connected to a plurality of nodes, such as end nodes 110 and intermediate nodes 200, to form an internetwork of nodes. These internetworked nodes communicate by exchanging data packets according to a predefined set of protocols, such as the Transmission Control Protocol/Internet Protocol (TCP/IP) and the Resource Reservation Protocol (RSVP).

Network 100 further comprises a series of data flows labeled F1-F8. Data flows F1-F4 originate at end node 110*a* and are part of a first aggregate flow 160*a* whose aggregator is intermediate node 200*a* and deaggregator is intermediate node 200*g*. Data carried by aggregate flow 160*a* travel from the aggregator 200*a* to the deaggregator 200*g* via intermediate nodes 200*b*, 200*c*, 200*h* and 200*f*. Flows F1-F4 terminate at end node 110*c*. Likewise, flows F5-F8 originate at end node 110*b* and are part of a second aggregate flow 160*b* whose aggregator is intermediate node 200*d* and deaggregator is intermediate node 200*j*. Data carried by aggregate flow 160*b* travel from the aggregator 200*d* to the deaggregator 200*j* via intermediate nodes 200*e*, 200*c*, 200*h* and 200*i*. Flows F5-F8 terminate at end node 110*d*.

Figure 2:
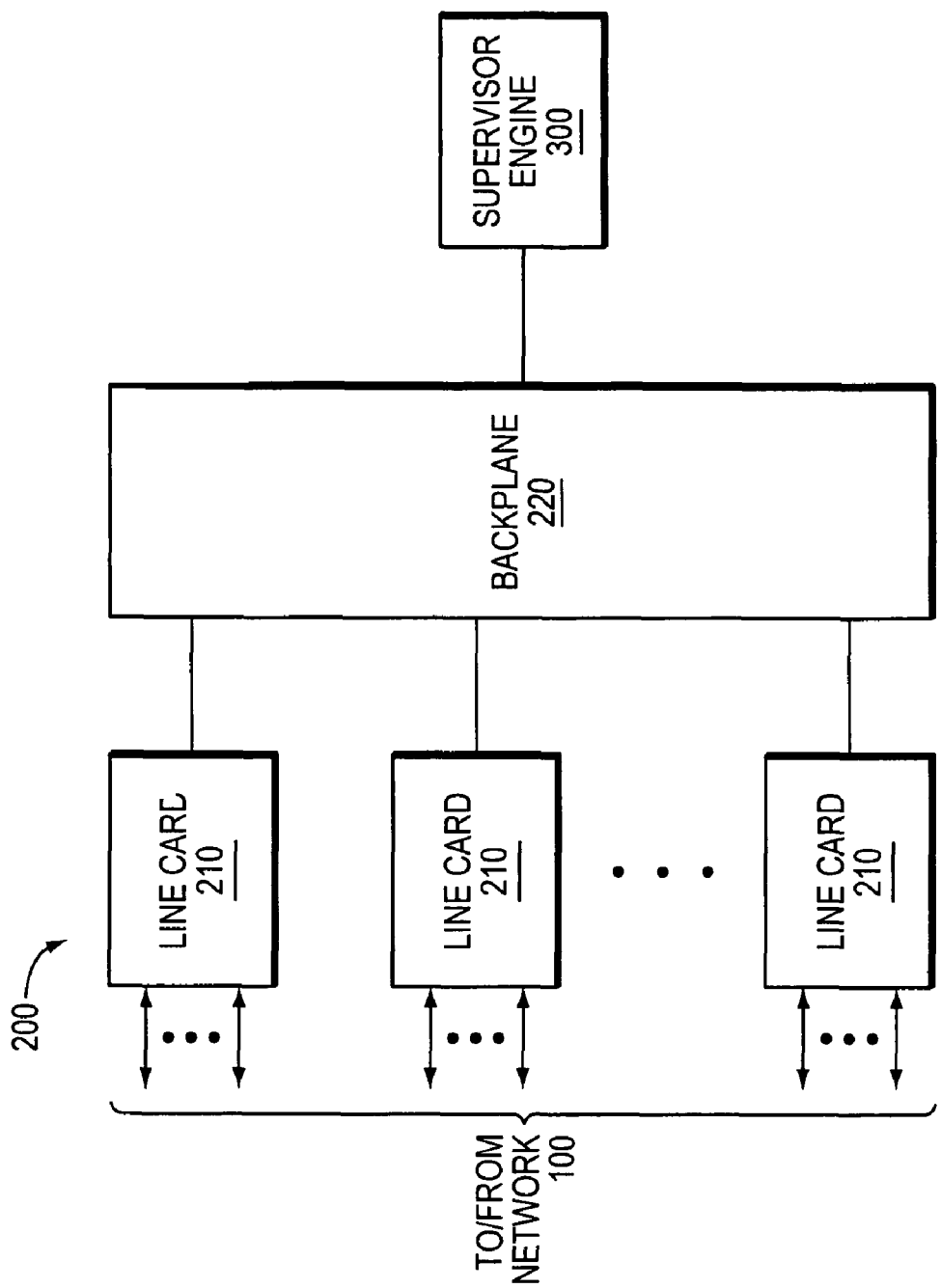
FIG. 2 is a high-level partial block diagram of an intermediate node that may be used with the present invention.

FIG. 2 is a high-level partial block diagram of an intermediate node 200 that may be used with the present invention. Illustratively, intermediate node 200 is a router comprising one or more line cards 210 and a supervisor engine card 300 interconnected by a backplane 220. Node 200 is configured to perform various conventional layer-2 (L2) and layer-3 (L3) switching and routing functions including forwarding and processing data packets in accordance with the inventive technique. As used herein, L2 and L3 refer to the data-link layer and network layer, respectively, of the Open Systems Interconnection Reference Model (OSI-RM). Node 200 may also be configured to support various combinations of protocols including, e.g., Open Shortest Path First (OSPF), Intermediate-System-to-Intermediate-System (IS-IS), TCP/IP, RSVP, Ethernet, Asynchronous Transfer Mode (ATM), and frame relay (FR). Suitable intermediate nodes that may be used with the present invention include the Cisco 7200 Series Routers and the Cisco 7600 Series Routers available from Cisco Systems Incorporated, San Jose, Calif.

The backplane 220 comprises point-to-point interconnections that interconnect the various cards and allows data and signals to be transferred between the cards. The line cards 210 connect (interface) the intermediate node 200 with the network 100 and enable the intermediate node 200 to transfer and acquire data packets to and from the network via ports using various protocols such as, e.g., ATM, Ethernet, and T3. To that end, line cards 210 comprise conventional interface circuitry that incorporates signal, electrical and mechanical characteristics, and interchange circuits, needed to interface with the physical media of the network 100 and protocols running over that media.

Functionally, the line cards 210 acquire data packets from the network 100 via the ports and forward the data packets to the backplane 220, as well as transfer data packets acquired from the backplane 220 to the network 100 via the ports. The ports may be conventional, e.g., ATM, Ethernet, Fast Ethernet (FE), Gigabit Ethernet (GE), and FR ports.

Figure 3:
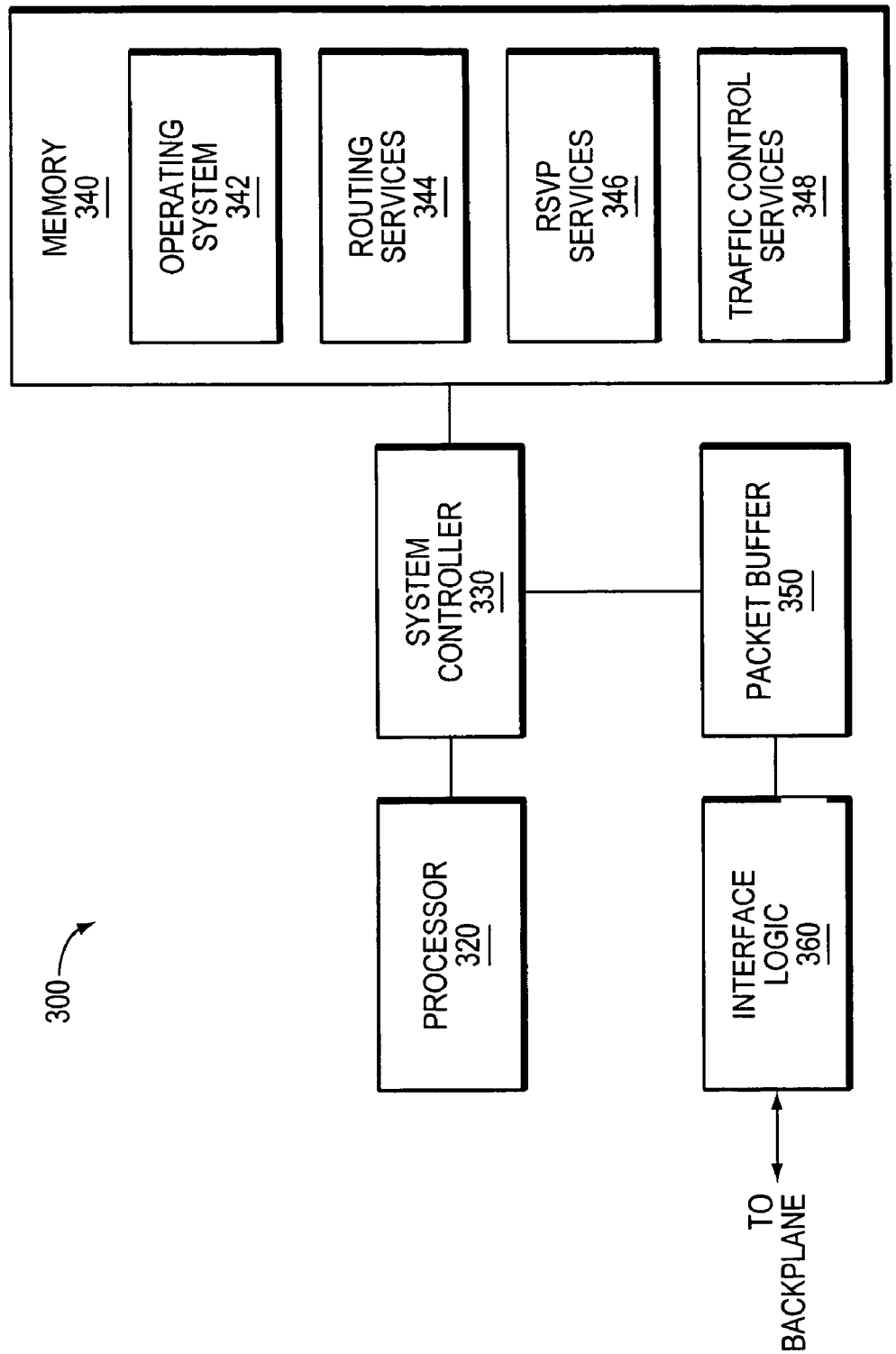
FIG. 3 is a high-level partial block diagram of a supervisor engine that may be used with the present invention.

The supervisor engine 300 comprises logic that is configured to manage node 200, execute various protocols, such as RSVP, and perform other functions including, processing RSVP messages in accordance with an aspect of the inventive technique. FIG. 3 is a high-level partial block diagram of a supervisor engine 300 that may be used with the present invention.

Supervisor engine 300 comprises interface logic 360, packet buffer 350, system controller 330, processor 320 and memory 340. Interface logic 360 is coupled to the backplane 220, and is configured to transfer data between the backplane 220 and the supervisor engine 300. Packet buffer 350 is a memory comprising high-speed RAM devices capable of storing data packets acquired by the interface logic 360 and processed by the processor 320. System controller 330 is coupled to the processor 320, memory 340 and packet buffer 350 and comprises circuitry configured to enable the processor 320 to access (e.g., read, write) memory locations contained in the memory 340 and the packet buffer 350. Processor 320 is a conventional central processing unit (CPU) configured to execute instructions contained in memory 340 for performing various functions in accordance with the present invention.

The memory 340 is a computer-readable medium comprising RAM devices, such as dynamic RAM (DRAM) devices, configured to implement e.g., a 128 Megabyte (Mb) RAM. Memory 340 contains various software and data structures used by processor 320 including software and data structures that implement aspects of the present invention. Memory 340 contains operating system 342, routing services 344, RSVP services 346 and traffic control services 348.

Operating system 342 functionally organizes the intermediate node 200 by invoking operations in support of software processes and services executing on the supervisor engine 300, such as routing services 344, RSVP services 346 and traffic control services 348. These services and processes may include software functions that implement various routing and switching protocols supported by the intermediate node 200 as well as functions that implement aspects of the present invention.

Routing services 344 contains software functions that implement various routing protocols, such as OSPF and IS-IS. These functions may be configured to manage a forwarding information database (not shown) containing, e.g., data used to make forwarding decisions. RSVP services 346 contain software functions for implementing RSVP and processing RSVP reservations in accordance with an aspect of the present invention.

Figure 4:
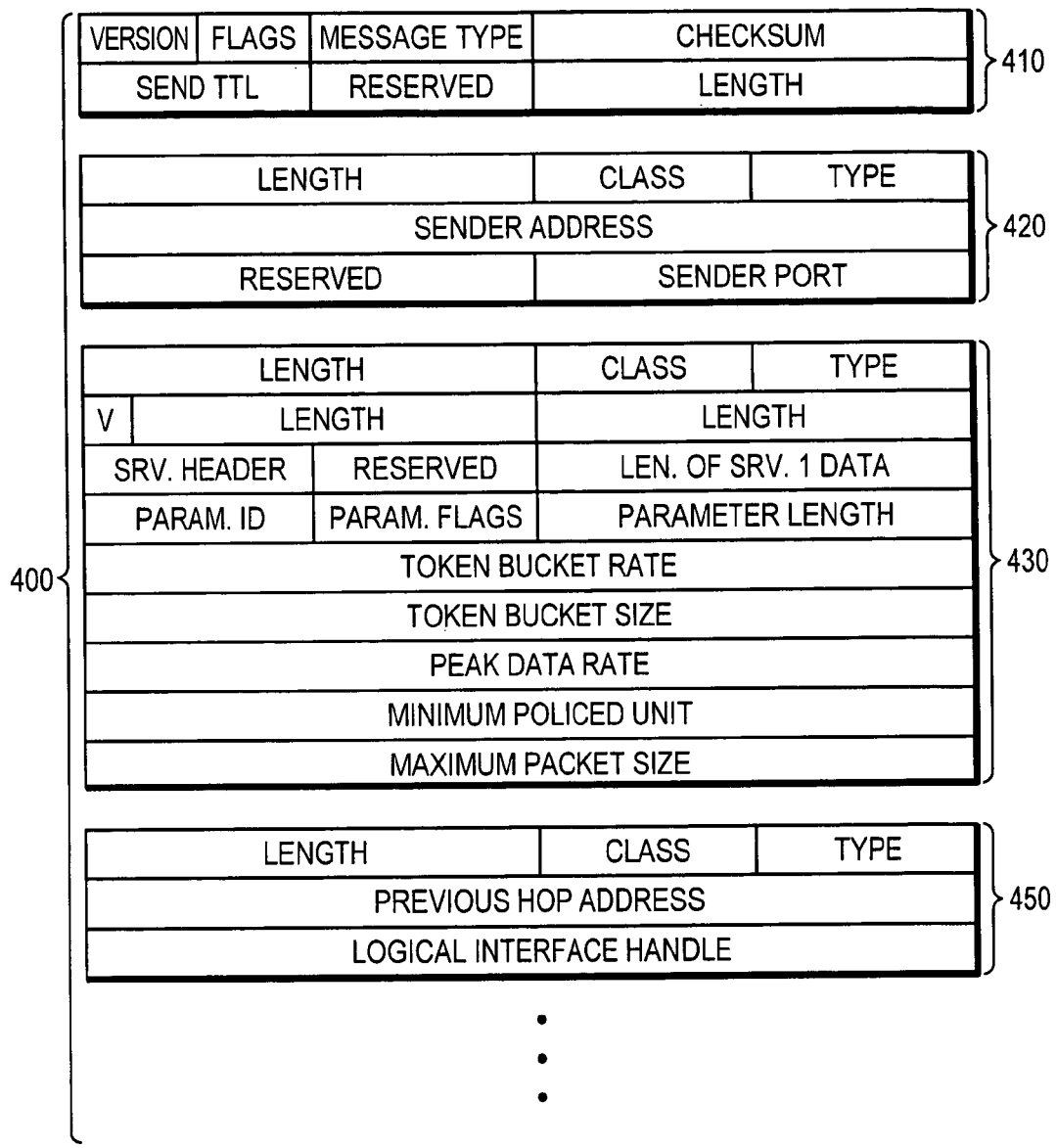
FIG. 4 illustrates a Resource Reservation Protocol (RSVP) path (Path) message that may be used with the present invention.

It should be noted that functions performed by intermediate node 200, including functions that implement aspects of the present invention, may be implemented in whole or in part using some combination of hardware and/or software. It should be further noted that computer-executable instructions and/or computer data that implement aspects of the present invention may be stored in other computer-readable mediums, such as volatile memories, non-volatile memories, flash memories, removable disks, non-removable disks and the like. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention on e.g., a data network. In accordance with RSVP, RSVP Path messages are used by a sender to indicate its presence as well as specify resources needed to accommodate a data flow between the sender and a receiver. FIG. 4 is an illustration of an RSVP Path message 400 that may be advantageously used with the present invention. Message 400 contains a common header 410, a sender template object 420, a traffic specification (Tspec) object 430 and a "previous-hop" object 450. It should be noted that message 400 may contain other objects, such as an Adspec object.

The header 410 contains information about the message 400 including a version field, a flags field, a message type field, a checksum field, a send "time-to-live" (TTL) field and a length field. The version field holds a version number that identifies the version of RSVP associated with the message 400. The flags field holds flags associated with the message 400. The message type field holds an identifier (ID) that identifies the message 400 as an RSVP Path message. The checksum field holds a value that represents a checksum associated with the message 400. The send TTL field holds a value that represents a "time-to-live" value for the message 400 and the length field holds a value that represents a length of the message 400, illustratively in bytes.

The sender template object 420 holds information about the sender. The object 420 comprises an object header, a sender address and a sender port. The object header further comprises length, class and type fields. The length field holds a value that represents a length of the object 420, illustratively in bytes. The class field holds a value that identifies the object 420 as belonging to the RSVP SENDER TEMPLATE class. The type field holds a value that indicates a type object within the object's class, such as an IP version 4 (IPv4) type object or an IP version 6 (IPv6) type object. The sender address field holds a value that represents an address (e.g., IPv4 address, IPv6 address) associated with the sender and the sender port field holds a value representing a port (e.g., IPv4 port, IPv6 port) associated with the sender.

The Tspec object 430 contains an object header and various traffic parameters associated with a data flow associated with the reservation. The object header comprises a length field, a class field and a type field which are similar to the object header, described above, except that the class field holds a value that indicates the object 430 is in the RSVP SENDER_TSPEC class and the type field holds a value that indicates the type of object within this class. The traffic parameters may include parameters defined in various well-known "int-serv" working group documents, such as S. Shenker, et al., "General Characterization Parameters for Integrated Service Elements," RFC 2215, available from the IETF and which is hereby incorporated by reference as though fully set forth herein.

The previous-hop object 450 contains an object header, a previous hop address field and a logical interface handle (LIH) field. The object header comprises a length field, a class field and a type field which are similar to the object headers, described above, except that the class field holds a value that indicates the object 430 is in the RSVP RSVP_HOP class and the type field holds a value that indicates a type object within this class, such as, e.g., IPv4 type object and IPv6 type object. The previous hop address field holds a value that represents an address (e.g., IPv4 address, IPv6 address) associated with a previous hop node. The LIH field holds a value that distinguishes logical outgoing interfaces associated with the path message 400.

Figure 5:
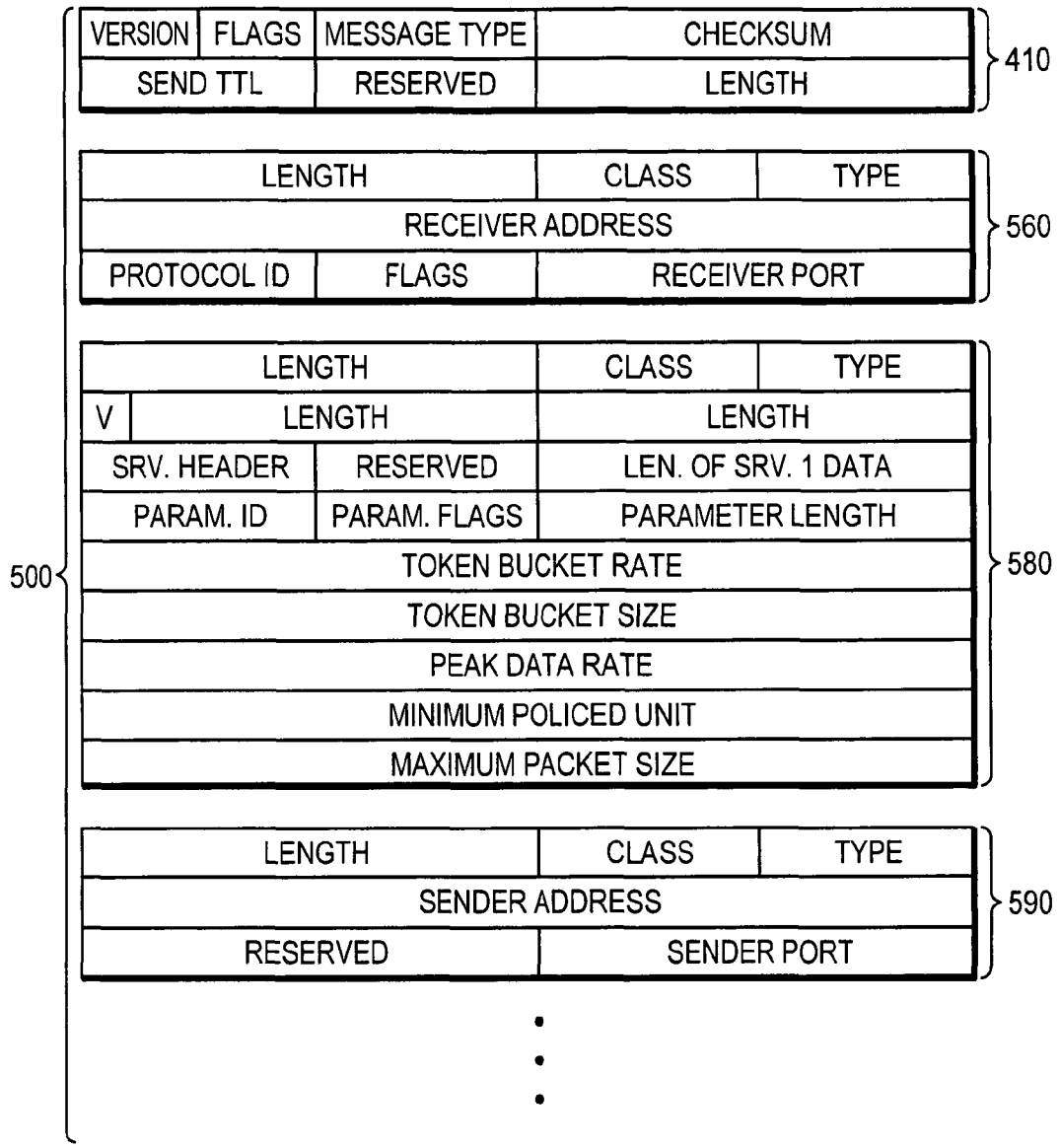
FIG. 5 illustrates an RSVP reservation (Resv) message that may be used with the present invention.

In accordance with RSVP, a receiver establishes a new reservation for resources for a data flow between a sender and a receiver by responding to the sender's Path message with a reservation request (Resv) message. The Resv message travels upstream hop-by-hop along the path used by the Path message from the receiver to the sender. The Resv message contains information that is used by intermediate nodes along the path to reserve resources for the data flow. FIG. 5 is an illustration of a RSVP Resv message 500 that may be advantageously used with the present invention. Message 500 contains a common header 410, session object 560, a flow specification (flowspec) object 580 and a filter specification (filter spec) object 590. It should be noted that the Resv message may contain other objects, such an INTEGRITY object and a RESV_CONFIRM object.

The common header 410 contains information, as described above, except that the message type field contains a value that identifies the message as a Resv message. The session object 560 defines a session specification for the data flow for which resources are being reserved. Specifically, the session object 560 contains an object header, a receiver address field, a protocol ID field, a flags field and a receiver port field. The object header contains information similar to the object headers described above except that the class field holds a value that identifies the session object 560 as belonging to the RSVP SESSION class and the type field holds a value that indicates a type of the object (e.g., IPv4 session object, IPv6 session object) within the class. The receiver address and receiver port fields illustratively hold an address (e.g., IP address) and a port (e.g., IP port), respectively, that is associated with the data flow's receiver. The protocol ID field holds an identifier that identifies a protocol associated with the data flow and the flags field holds various flags associated with the data flow.

The flowspec object 580 contains information that defines various traffic characteristics associated with the new reservation. Specifically, the flowspec object 580 contains an object header, comprising length, class and type fields, and various traffic parameters. The object header holds information similar to the object headers described above except that class field holds a value that indicates the object 580 belongs to the RSVP FLOW_SPEC class and the type field holds a value that indicates a type of object within the class. The traffic parameters may include parameters defined in various "int-serv" working group documents, such as parameters described in previously incorporated RFC 2215.

The filter spec object 590 contains information related to the sender. Specifically, the filter spec object 590 contains an object header, a sender address field and a sender port field. The object header holds information similar to the object headers described above except that the class field holds a value that indicates the object belongs to the RSVP FILTER_SPEC class and the type field holds a value that indicates a type of address (e.g., IPv4, IPv6) held in the sender address and port fields. The sender address and sender port fields hold an address and port, respectively, of the data flow's sender.

Figure 6:
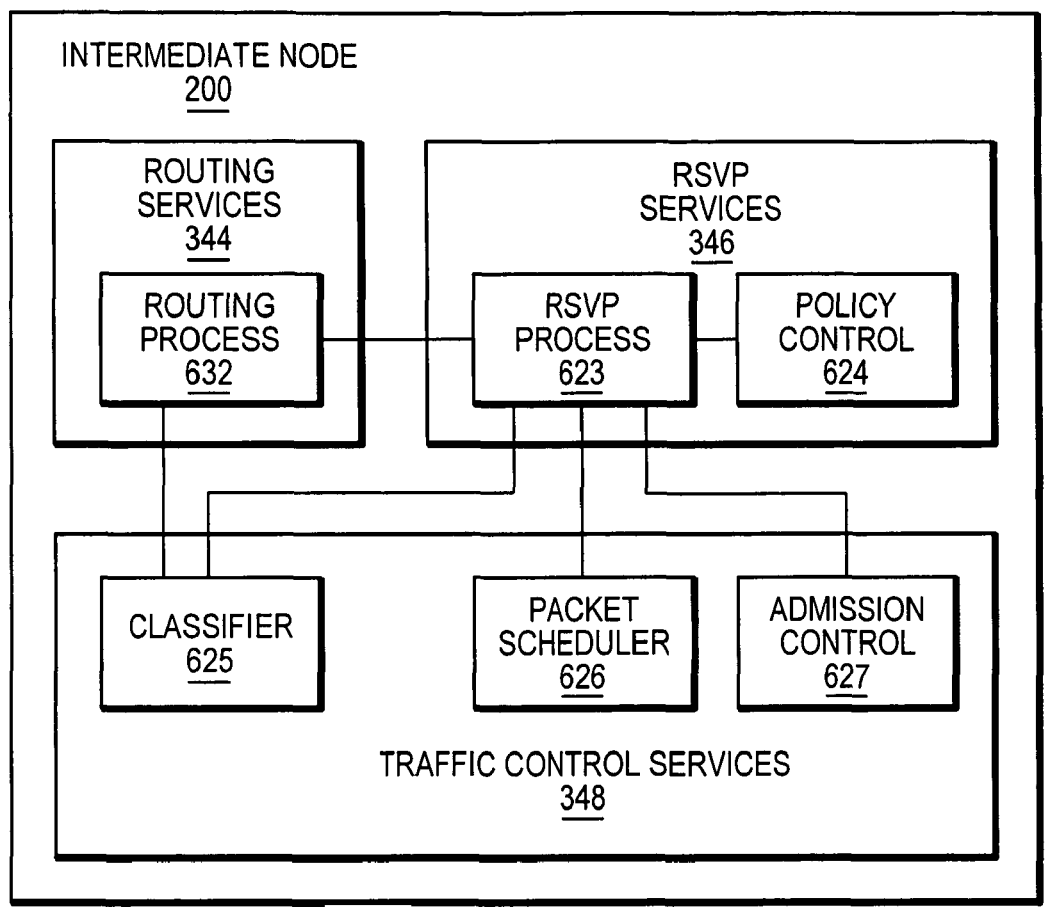
FIG. 6 is a high-level partial block diagram illustrating various functional blocks associated with RSVP.

As noted above, intermediate node 200 contains various services including routing services 344, RSVP services 346 and traffic control services 348. The routing services 344 implement various conventional routing functions and the RSVP services 346 and traffic control services 348 implement various functions associated with RSVP. FIG. 6 illustrates these services in more detail.

The routing services 344 include a routing process 632 which performs various conventional routing functions, such as maintaining a routing database (not shown) and forwarding data packets handled by the intermediate node 200 at the L3 layer including data packets (e.g., messages) associated with RSVP. The routing process 632 may be configured to implement various conventional routing protocols, such as OSPF and IS-IS.

The RSVP services 346 comprise a policy control function 634 and an RSVP process 623. The policy control function 634 determines if a particular requestor associated with a reservation request has the correct privileges to make a reservation on the intermediate node 200. The RSVP process 623 contains reservation services that manage reservations and process messages associated with reservations in accordance with an aspect of the present invention. Specifically, process 623 processes RSVP messages and maintains state (e.g., session tables) associated with reservations processed by the intermediate node 200. In addition, as will be described further below, process 623 is configured to (1) identify existing reservations to be preempted, if sufficient resources are not available to accommodate a newer higher-priority reservation and (2) generate an error message wherein the error message indicates an amount of resources that are available for existing reservations, in accordance with an aspect of the present invention.

The traffic control services 348 comprise an admission control function 627, a packet scheduler 626 and a classifier 625. The admission control function 627 determines if the intermediate node 200 has sufficient resources to accommodate a particular request for resources (e.g., Resv message). The packet scheduler 626 and classifier 625 are configured to (1) handle data packets associated with data flows which already have resources reserved on the intermediate node 200 and (2) achieve a level of QoS for those data flows. Specifically, the packet classifier 625 determines QoS classes for the data packets and the packet scheduler 626 and schedules the data packets for transfer from the intermediate node 200 according to the data packets' QoS classes.

Operationally, a signaling message (e.g., Resv message) acquired by the intermediate node 200 is forwarded to the RSVP process 623 by the routing services 344. The RSVP process 623 processes the signaling message including checking directing the policy control 624 to determine if the originator of the signaling message has permission to make a reservation on the intermediate node 200. If so, the RSVP process 623 queries the admission control 627 to determine if sufficient resources are available on the intermediate node 200 for the reservation. If sufficient resources are available, various parameters are established in the packet classifier 625 and packet scheduler 626 to obtain a QoS requested by the signaling message. The RSVP process 623 may then transfer the message to the routing process 632 for forwarding to the next intermediate node 200 in the path associated with the reservation.

In accordance with RSVP, a flowspec object 580 in combination with a filter spec object 590 is often called a "flow descriptor." The flowspec 580 specifies a desired QoS and the filter spec 590 together with session information, defines the set of data packets to receive the QoS specified in the flowspec 580. The flowspec 580 is used to set parameters in the packet scheduler 626 or other link layer mechanism, while the filter spec 590 is used to set parameters in the packet classifier 625. Data packets that are addressed to a particular session but do not match any of the filter specs 590 for that session are handled as best-effort traffic.

Figure 7:
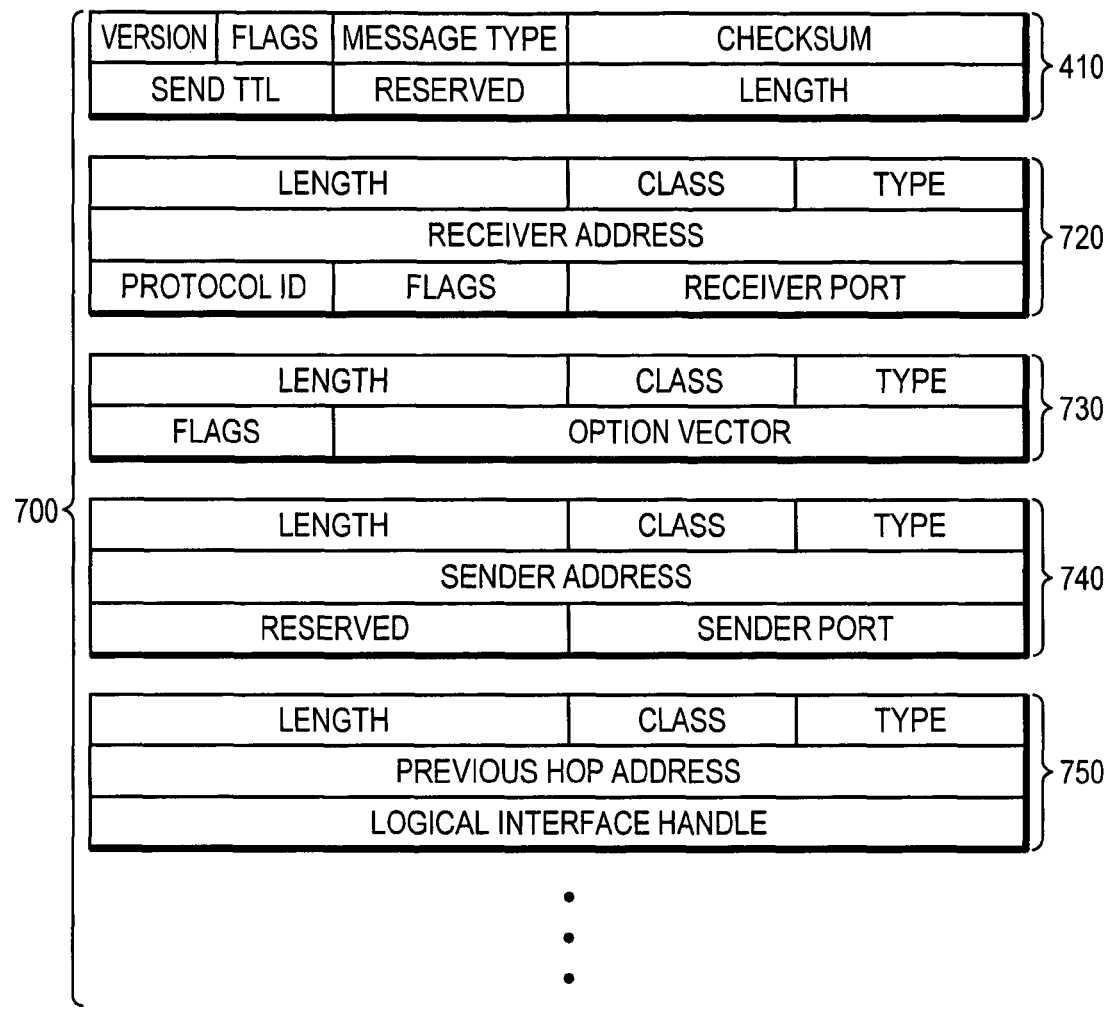
FIG. 7 illustrates an RSVP reservation teardown (ResvTear) message that may be used with the present invention.

In RSVP, reservations may be deleted using a teardown message known as a ResvTear message. FIG. 7 illustrates an RSVP reservation teardown (ResvTear) message 700 that may be used with the present invention. Message 700 comprises a common header 410, a session object 720, a style object 730, a filter spec object 740 and a previous hop object 750. The combination of the session object 720, style object 730, filter spec object 740 and previous hop object 750 identifies the reservation that is to be torn down.

The common header 410 contains information, as described above except that the message type field contains a value that identifies the message as a ResvTear message. The session object 720 contains information similar to the session object described above except that the receiver address and receiver port fields hold information about a receiver associated with the reservation that is being torn down.

The style object 730 contains an object header, a flags field and an option vector field. The object header holds information similar to the object headers described above except that the class field holds a value that identifies the object as belonging to the RSVP STYLE class and the type field holds a value that is illustratively set to one. The flags field is currently unused. The options vector field holds a value that represents various reservation options associated with the reservation being torn down, such as sharing control and sender selection control.

The filter spec object 740 contains information similar to the filter spec object described above except that the information is associated with the reservation being torn down. The previous-hop object 750 contains information similar to the previous-hop object described above except that the information is associated with the reservation being torn down.

Figure 8:
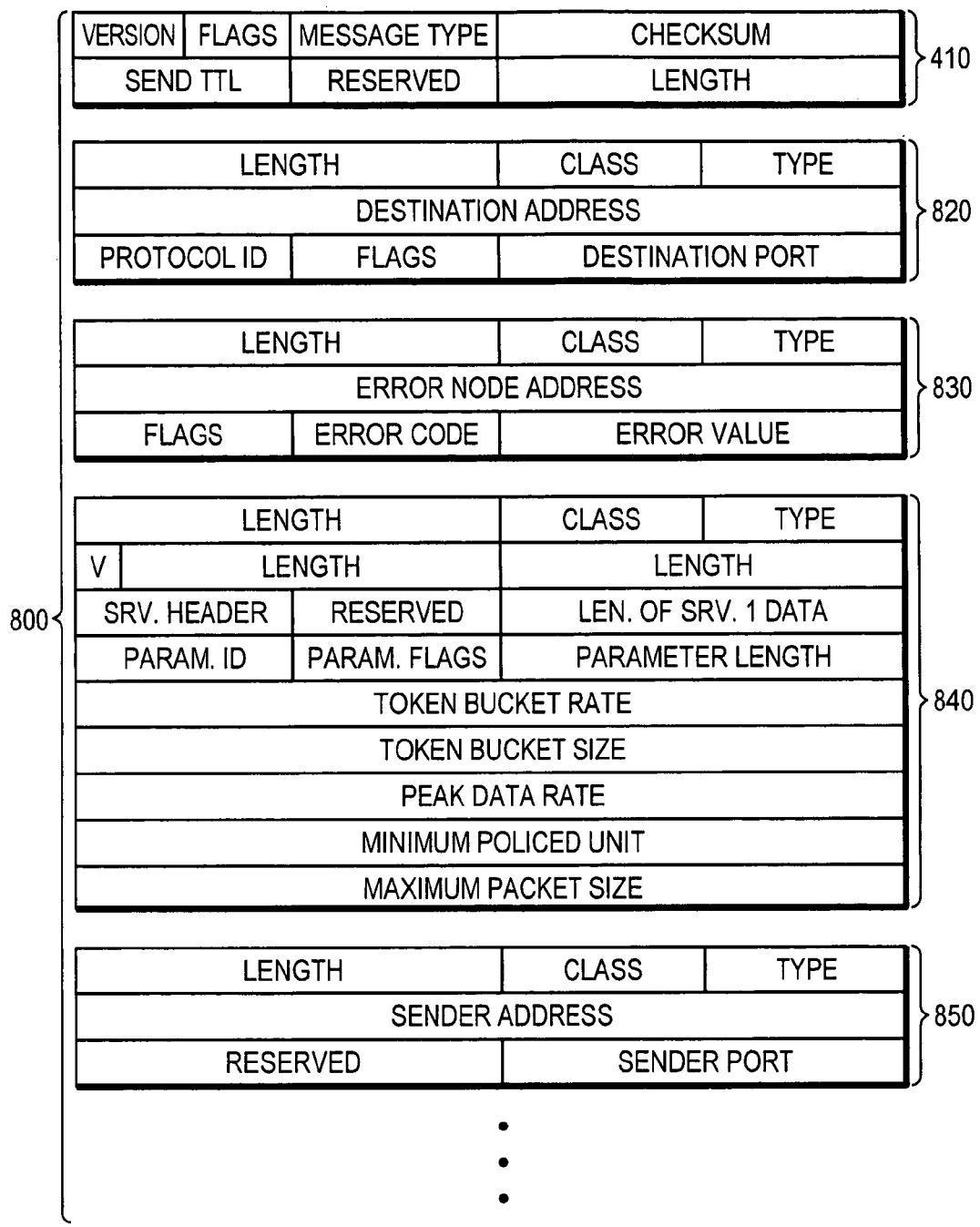
FIG. 8 illustrates an RSVP reservation error (ResvErr) message that may be used with the present invention.

In accordance with an aspect of the present invention, error messages are used to report error conditions (e.g., partial preemption) associated with reservations. FIG. 8 illustrates an error message 800 that may be used to report error conditions in accordance with an aspect of the present invention. Message 800 is illustratively an RSVP ResvErr message comprising a common header object 410, a session object 820, an error specification (error spec) object 830, a flowspec object 840 and a filter spec object 850. It should be noted that message 800 may contain other objects, such as policy data objects as described in S. Herzog, "RSVP Extensions for Policy Control," RFC 2750, available from the IETF, and is incorporated herein by reference.

The common header object 410 contains information, as described above, except the message type field holds a value that identifies the message as a ResvErr message. The session object 820 holds information similar to the session objects described above except that it contains information about the data flow associated with the error reported in the ResvErr message 800.

The error spec object 830 contains an object header comprising length, class and type fields, an error node address field, a flags field, an error code field, and an error value field. The object header holds information similar to the object headers described above except that the class field holds a value that indicates the object is in the error spec class and the type field holds a value that indicates a type of address held in the error node address field (e.g., IPv4 address, IPv6 address). The error node address field holds a value that indicates an address of the node where the error condition was detected. The flags field holds various flag values and the error code field holds an error description. The error code field holds a value that illustratively indicates an error condition, such as a policy control failure has occurred. The error value field illustratively holds an error sub-code value that indicates additional information about the error condition, such as the data flow represented in the session object 820 is being partially preempted.

The flowspec object 840 holds information similar to the flowspec objects described above except that where a reservation is partially preempted the peak data rate and highest average data rate that the preempting system generating the ResvErr message 800 can accept is indicated in the peak data rate and token bucket rate fields, respectively, of the message 800.

Figure 9:
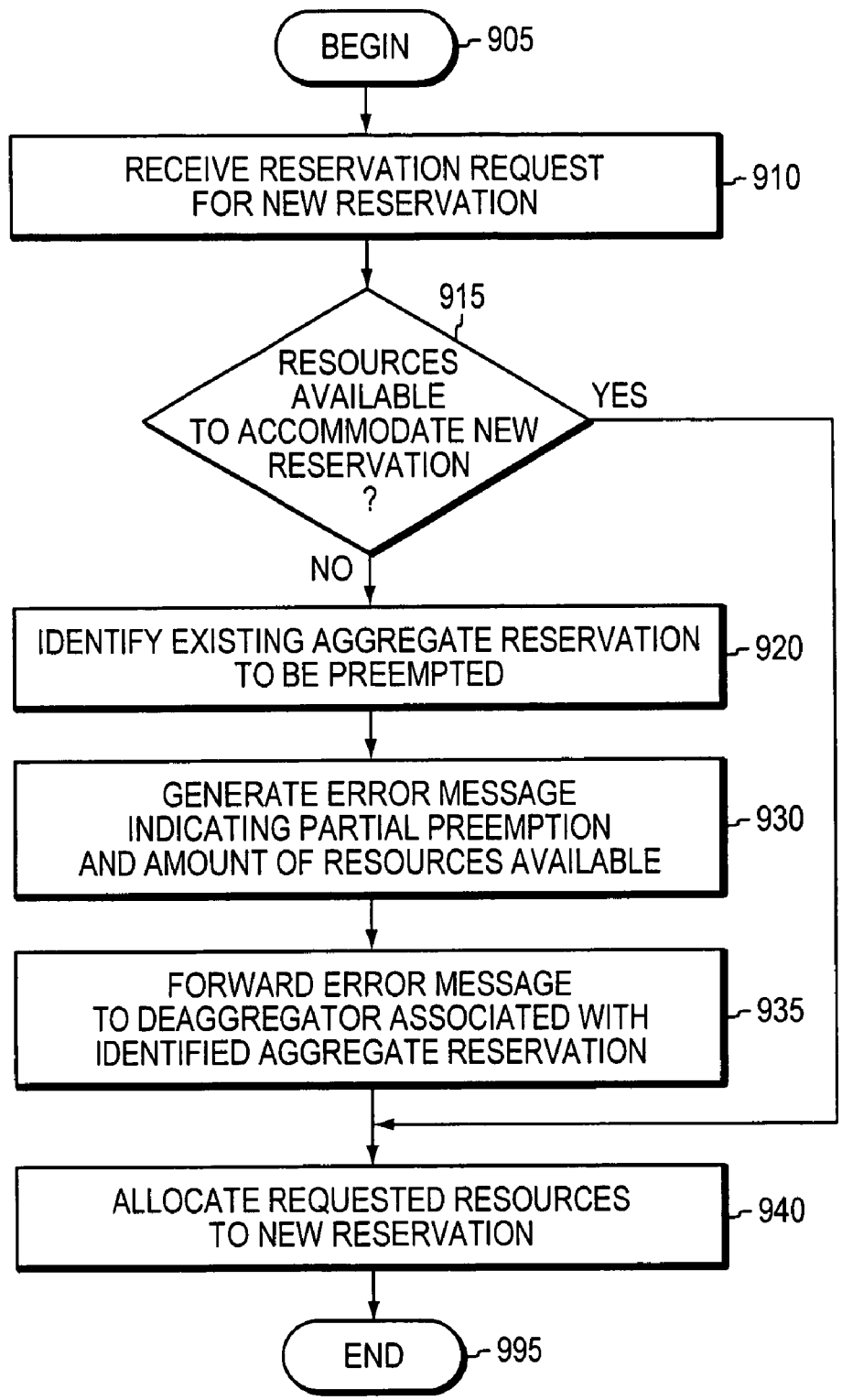
FIG. 9 is a flow chart of a sequence of steps that may be used to process a reservation message in accordance with an aspect of the present invention.

In accordance with an aspect of the present invention, a preempting system processes a request to reserve resources for a new reservation by (1) determining if the new reservation can be accommodated without preempting any existing reservations and (2) if not, partially preempting an existing reservation. The existing reservation is illustratively partially preempted by generating and issuing an error message 800 that indicates partial preemption of the reservation and an amount of resources available for the partially preempted reservation. FIG. 9 is a flow chart of a sequence of steps that may be used to process a request to reserve resources for a new reservation in a data network in accordance with an aspect of the present invention.

The sequence begins at step 905 and proceeds to step 910 where the reservation request for the new reservation is received. Next, at step 915, a check is performed to determine if sufficient resources are available to accommodate the new reservation. Here, "sufficient resources" means that enough resources are available to accommodate the request without having to preempt any existing reservations. If so, the resources are allocated to the new reservation (step 940) and the sequence proceeds to step 995. Otherwise, at step 920, an existing aggregate reservation in the data network to be partially preempted is identified e.g., on the basis of priority. At step 935, an error message is generated wherein the error message indicates (1) that the identified preempted aggregate reservation is to be partially preempted and (2) an amount of resources available for the preempted aggregate reservation. Illustratively, the amount of resources indicated is the difference between the amount of resources currently allocated to the preempted aggregate reservation and the amount of resources from the partially preempted aggregate reservation that are allocated to the higher-priority new reservation. At step 940, the generated error message is then forwarded downstream to a deaggregator associated with the identified aggregate reservation. The sequence then proceeds to step 940 where resources are allocated to the new reservation. The sequence ends at step 995.

Figure 10:
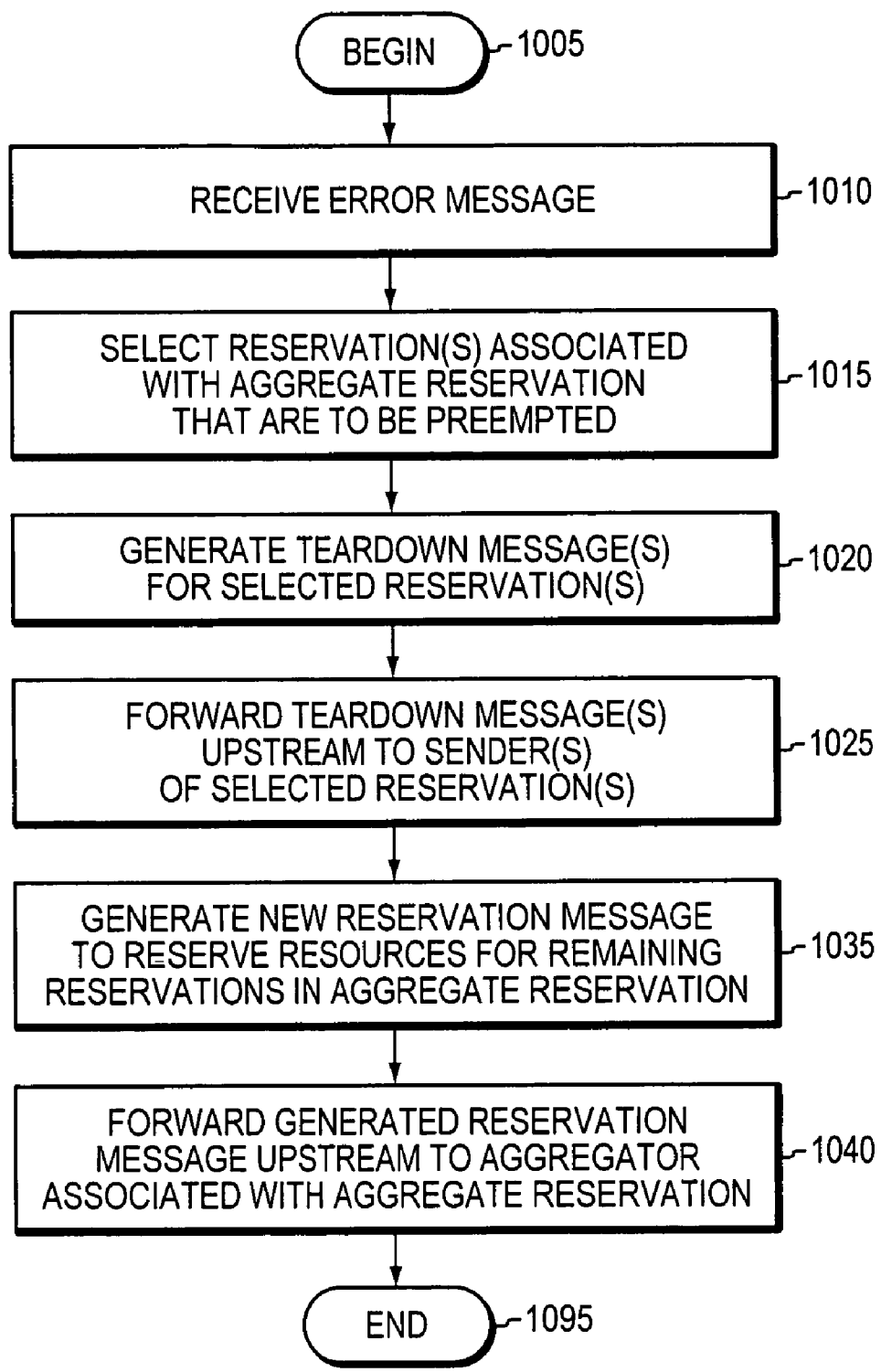
FIG. 10 is a flow chart of a sequence of steps that may be used to process a reservation error message in accordance with an aspect of the present invention.

FIG. 10 is a flow chart of a sequence of steps that may be used to process an error message indicating partial preemption of a reservation in accordance with an aspect of the present invention. The sequence begins at step 1005 and proceeds to step 1010 where the error message indicating partial preemption of an aggregate reservation is received. Next, at step 1015, reservations associated with the aggregate reservation are selected to be preempted. For each selected reservation, at step 1020, a teardown message is generated for the reservation and, at step 1025, the generated teardown message is forwarded upstream to the reservation's sender.

At step 1035, a new reservation is generated to reserve resources for the remaining reservations associated with the partially preempted aggregate reservation. At step 1040, the new reservation message is forwarded upstream to the aggregate reservation's aggregator. The sequence ends at step 1095.

For example, referring to FIGS. 1, 9 and 10, assume that flows F1, F2, and F3 are members of aggregate flow 160a, intermediate nodes 200a and 200g are the aggregator and deaggregator for flow 160a, respectively, flows F5, F6, F7 and F8 are members of aggregate flow 160b and intermediate nodes 200d and 200j are the aggregator and deaggregator for flow 160b, respectively. Further assume that aggregate flow 160a is higher in priority than aggregate flow 160b and that both aggregate flows 160a, 160b are carried through intermediate node 200c.

Now assume F4 is to be added to aggregate flow 160a and that intermediate node 200c does not have sufficient resources available to accommodate flow F4. Intermediate node 200a generates a conventional Path message 400 for flow F4 and forwards it onto the network 100. The Path message 400 travels hop-by-hop from intermediate node 200a to intermediate node 200g via intermediate nodes 200b, 200c, 200h, and 200f. Since intermediate node 200g is the deaggregator node for aggregate flow 160a, it responds to the path message 400 by generating a conventional Resv message 500 to reserve resources for flow F4 and add it to the aggregate flow 160a. The generated Resv message 500 is forwarded onto the network 100 towards the flow 160a's aggregator node 200a. The Resv message 500 travels hop-by-hop from intermediate node 200g towards intermediate node 200a and is eventually received by intermediate node 200c.

Turning now to FIG. 9, at step 910, intermediate node 200c receives the Resv message 500 and determines if sufficient resources are available to accommodate the new reservation (step 915). Since as noted above, node 200c does not have sufficient resources available to accommodate flow F4, intermediate node 200c proceeds to step 920 where it identifies the aggregate reservation associated with aggregate flow 160b as the reservation that is to be partially preempted since it is lower in priority than the reservation associated with flow 160a. At step 930, intermediate node 200c generates a ResvError message 800 indicating partial preemption of the identified aggregate reservation in the message 800. Specifically, intermediate node 200c generates values for the various portions of message 800 including the header 810, the session object 820 the error spec object 830, the flowspec object 840 and a filter spec object 850 in a conventional manner identifying the aggregate reservation. In addition, intermediate node 200c places an error code value in the error spec object 830 that indicates that the reservation is being partially preempted, and places values in the flowspec object 840 to indicate the highest average and peak rates that intermediate node 200c can accept for the reservation, as described above. At step 935, intermediate node 200c forwards the generated ResvErr message 800 onto the network 100 towards the deaggregator node 200j associated with the identified aggregate reservation. Now that sufficient resources are available on node 200c, at step 940, the node 200c reserves the requested resources for the reservation associated with the Resv message 500.

The ResvErr message 800, forwarded at step 935, travels hop-by-hop to the deaggregator node 200j via intermediate nodes 200h and 200i. Turning now to FIG. 10, intermediate node 200j receives the ResvErr message 800 (step 1010) and processes it including selecting one or more reservations associated with aggregate reservation that are to be preempted (step 1015). Note that node 200j may take into consideration the highest average and peak rates information contained in the ResvErr message 800 when selecting the reservations to be preempted.

For each selected reservation, intermediate node 200j generates a ResvTear message 700 (step 1020) to teardown the selected reservation. Assume that the reservation associated with flow F8 has been selected to be preempted. Node 200j generates a ResvTear message 700 to teardown the reservation associated with flow F8 and forwards it to the sender associated with the reservation (step 1025) to teardown the reservation in a conventional manner.

Intermediate node 200j then generates a Resv message 500 for the remaining reservations associated with flows F5-F7 to reserve resources for these flows (step 1035). The generated Resv message 500 is forwarded upstream to flow 160b's aggregator 200d (step 1040) via nodes 200i, 200h, 200c, and 200e which process the Resv message 500 in a conventional manner and reserve resources for the remaining flows.

It should be noted that the above-described technique may be adapted to partially preempt individual reservations. Here, a receiver associated with a partially preempted reservation that receives an error message indicating an amount of resources available for the partially preempted reservation may not teardown the reservation but simply re-reserve or re-negotiate resources for the reservation at an amount e.g., indicated in the error message.

In addition, it should be noted that the above-described technique may be adapted to partially preempt reservations nested within reservations. For example, assume an aggregate reservation comprises ten individual reservations wherein each individual reservation is for resources to accommodate 80 kilobits-per-second (kps) of bandwidth. Now assume a higher priority reservation that requests resources to accommodate 100 kps of bandwidth is to be accommodated and that all of the available resources have already been allocated to the aggregate reservation. In accordance with an aspect of the present invention, a reservation error message indicating partial preemption is generated and sent to the aggregate reservation's deaggregator, as described above. The deaggregator may process the reservation error message by e.g., selecting a first reservation within the aggregate reservation to preempt in its entirety and a second reservation within the aggregate reservation to partially preempt. The second reservation may be partially preempted by generating an error message indicating partial preemption and sending the error message to the second reservation's receiver, as described above. The second reservation's receiver would process the error message by e.g., re-reserving or renegotiating the second reservation.

In the above-described embodiments of the invention, the error message associated with a partially preempted reservation is described as containing an error code field that indicates the reservation is being partially preempted. It should noted that other techniques may be used to indicate the reservation is being preempted. For example, a flag field in the error message may be used to indicate a reservation is being partially preempted. Moreover, the presence of e.g., an amount of resources that is available for the preempted reservation in the error message may be used to indicate the reservation is being partially preempted.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for processing a request to reserve resources in an intermediate node for a new reservation, the method comprising:
   determining if the intermediate node has sufficient resources available to accommodate the new reservation; and
   if sufficient resources are not available in the intermediate node to accommodate the new reservation:
   (a) identifying an existing aggregate reservation associated with the intermediate node to have part of the resources of the identified existing aggregate reservation preempted, and
   (b) generating an error message at the intermediate node wherein the error message indicates that part of the resources of the identified existing aggregate reservation is being preempted and further indicates an amount of resources that is available for the identified existing aggregate reservation, the amount of resources available to the aggregate reservation being a difference between the amount of resources allocated to the aggregate reservation before preemption and the amount of resources that are allocated to the new reservation.

2. A method as defined in claim 1 further comprising:
   forwarding the error message to a receiver associated with the identified existing reservation.

3. A method as defined in claim 1 further comprising:
   allocating resources in the intermediate node to the new reservation.

4. A method as defined in claim 1 wherein the error message is a Resource Reservation Protocol (RSVP) ResvErr message.

5. An intermediate node for processing a request to reserve resources in the intermediate node for a new reservation, the intermediate node comprising:
   an interface configured to receive the request to reserve resources in the intermediate node for the new reservation; and
   a processor coupled to the memory and configured to:
      (a) determine if the intermediate node has sufficient resources available to accommodate the new reservation, and
      (b) if sufficient resources are not available to accommodate the new reservation:
         (1) identify an existing aggregate reservation associated with the intermediate node to have part of the resources of the identified existing aggregate reservation preempted, and
         (2) generate an error message wherein the error message indicates that part of the resources of the identified existing aggregate reservation is being preempted and further indicates an amount of resources that is available for the identified existing aggregate reservation, the amount of resources available to the aggregate reservation being a difference between the amount of resources allocated to the aggregate reservation before preemption and the amount of resources that are allocated to the new reservation.

6. An intermediate node as defined in claim 5 wherein the processor is further configured to:
   forward the error message to a receiver associated with the identified existing reservation.

7. An intermediate node as defined in claim 5 wherein the processor is further configured to:
   allocate resources in the intermediate node to the new reservation, if sufficient resources are available in the intermediate node.

8. An intermediate node as defined in claim 5 wherein the error message is a Resource Reservation Protocol (RSVP) ResvErr message.

9. An apparatus for processing a request to reserve resources in the apparatus for a new reservation, the apparatus comprising:
   means for determining if the apparatus has sufficient resources available to accommodate the new reservation;
   means for identifying an existing aggregate reservation to have part of the resources of the identified existing aggregate reservation preempted if sufficient resources are not available to accommodate the new reservation; and
   means for generating an error message wherein the error message indicates that part of the resources of the identified existing reservation is being partially and further indicates an amount of resources that is available for the identified existing aggregate reservation, the amount of resources available to the aggregate reservation being a difference between the amount of resources allocated to the aggregate reservation before preemption and the amount of resources that are allocated to the new reservation.

* * * * *